(12) United States Patent
Mirza

(10) Patent No.: US 9,662,964 B1
(45) Date of Patent: May 30, 2017

(54) CAR DOOR PROTECTOR

(71) Applicant: Abdullah Ayman Abd Alrasoul Mirza, Safat (KW)

(72) Inventor: Abdullah Ayman Abd Alrasoul Mirza, Safat (KW)

( * ) Notice: Subject to any disclaimer, the term of this patent is extended or adjusted under 35 U.S.C. 154(b) by 0 days.

(21) Appl. No.: 15/284,511

(22) Filed: Oct. 3, 2016

(51) Int. Cl.
| | | |
|---|---|---|
| *B60J 11/00* | (2006.01) | |
| *B60J 11/06* | (2006.01) | |
| *B60J 5/04* | (2006.01) | |
| *B60R 19/03* | (2006.01) | |
| *B60R 19/40* | (2006.01) | |
| *B60R 19/42* | (2006.01) | |
| *B60R 13/04* | (2006.01) | |

(52) U.S. Cl.
CPC .......... *B60J 11/06* (2013.01); *B60J 5/0493* (2013.01); *B60R 13/04* (2013.01); *B60R 19/03* (2013.01); *B60R 19/40* (2013.01); *B60R 19/42* (2013.01)

(58) Field of Classification Search
CPC ......... B60R 19/42; B60R 13/04; B60R 19/03; B60R 19/40; B60J 11/06; B60J 5/0493
USPC ....................................................... 293/128
See application file for complete search history.

(56) References Cited

U.S. PATENT DOCUMENTS

| 3,197,176 | A | 9/1964 | Haslam | |
|---|---|---|---|---|
| 3,718,357 | A | 2/1973 | Hertzell | |
| 4,221,412 | A | 9/1980 | Miller | |
| 4,961,605 | A | 10/1990 | Cawthron et al. | |
| 5,004,281 | A | 4/1991 | Yamazaki | |
| 5,188,407 | A | 2/1993 | Villaveces et al. | |
| 7,077,440 | B1 * | 7/2006 | Morales | B60R 19/42 293/127 |
| 7,222,895 | B2 | 5/2007 | Ohara | |
| 2015/0123412 | A1 * | 5/2015 | Kim | B60R 13/043 293/128 |

FOREIGN PATENT DOCUMENTS

KR      10-1357743      2/2014

\* cited by examiner

*Primary Examiner* — Joseph D Pape
(74) *Attorney, Agent, or Firm* — Richard C. Litman

(57) ABSTRACT

A car door protector includes a base member configured to extend along the width of the door of the car, a moveable bumper, and a plurality of links connecting the base member to the moveable bumper. The moveable bumper can be disposed within a slot of the base member in a first configuration, and moved outside of the slot in a second configuration. The base can be attached to a door of a parked car. The magnet can be pulled towards the moving door of a car parked in an adjacent space when the door approaches a predetermined distance. The attraction between the magnet and the moving door can cause the bumper to move out of the slot towards the moving door and, thereby, absorb an impact from the moving door.

8 Claims, 4 Drawing Sheets

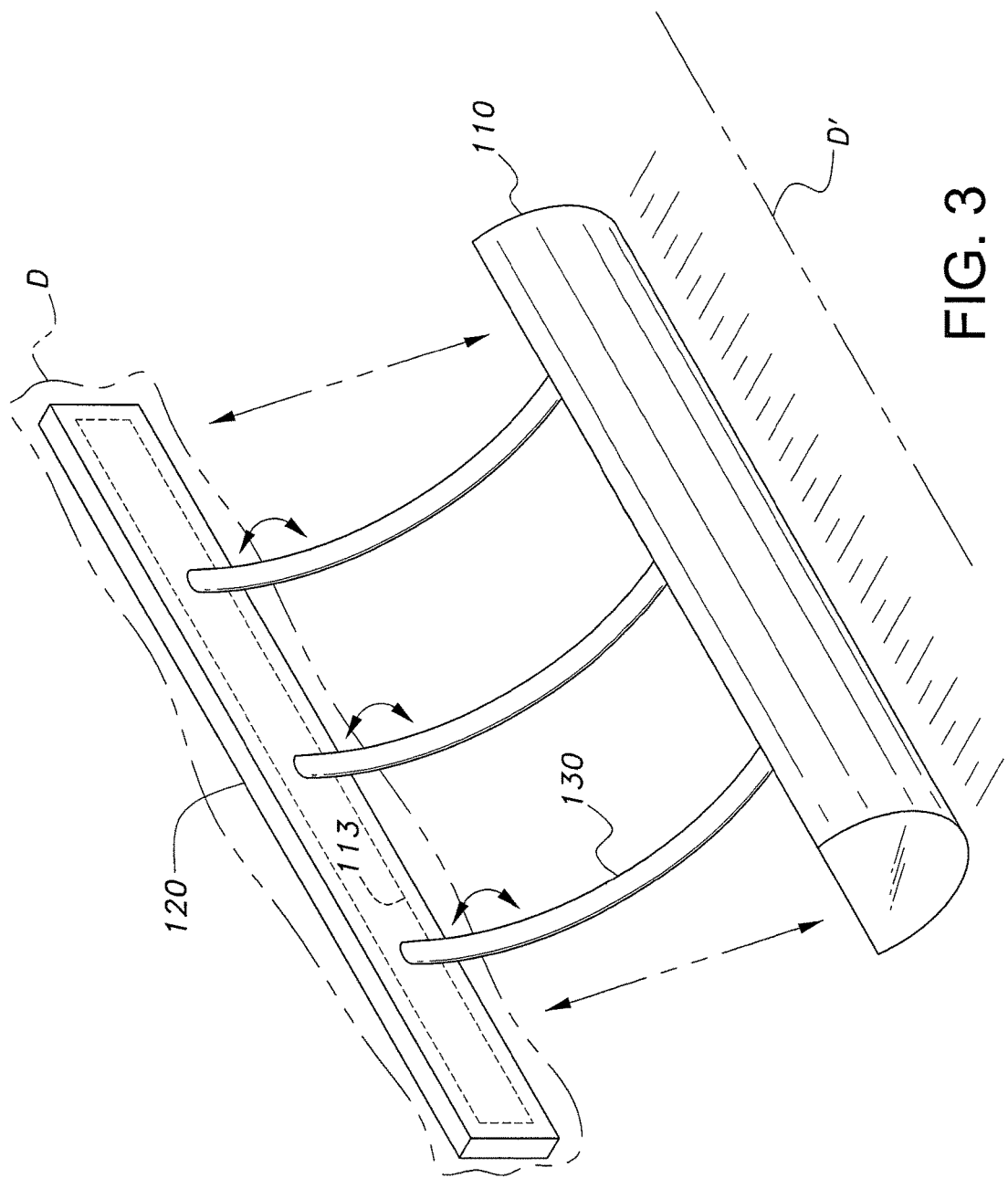

CAR DOOR PROTECTOR

BACKGROUND OF THE INVENTION

1. Field of the Invention

The present invention relates to automotive safety accessories, and particularly to a car door bumper configured for attachment to an exterior of a car door.

2. Description of the Related Art

A car parked in a parking lot is vulnerable to dents, scratches, and scrapes when doors of cars parked in adjacent spaces are opened. Small blows and scratches can accumulate over time and significantly detract from the appearance of the car. Conventional protective devices for car doors have failed to adequately protect car doors from being impacted by doors of adjacent cars, especially when the adjacent cars are larger and have doors that are higher or elevated further from the ground.

Thus, a car door protector solving the aforementioned problems is desired.

SUMMARY OF THE INVENTION

A car door protector is configured for protecting a door of a parked car from dents, scratches, scrapes, and other types of damage that may result from impact by a door of a different car parked in an adjacent space. The car door protector includes a base member configured to extend along the width of the door of the car, a moveable bumper, and a plurality of links connecting the base member to the moveable bumper. The moveable bumper can be disposed within a slot of the base member in a first configuration, and moved outside of the slot in a second configuration. For example, the magnet can be pulled towards the moving door of a car parked in an adjacent space when the door approaches a predetermined distance from the car door protector. The attraction between the magnet and the moving door can cause the bumper to move out of the slot towards the moving door and, thereby, absorb an impact from the door.

These and other features of the present invention will become readily apparent upon further review of the following specification and drawings.

BRIEF DESCRIPTION OF THE DRAWINGS

FIG. 3 illustrates the movement of the bumper away from the base member and towards a door of an adjacent car, according to the present invention.

Similar reference characters denote corresponding features consistently throughout the attached drawings.

DETAILED DESCRIPTION OF THE PREFERRED EMBODIMENTS

Figure 1A:
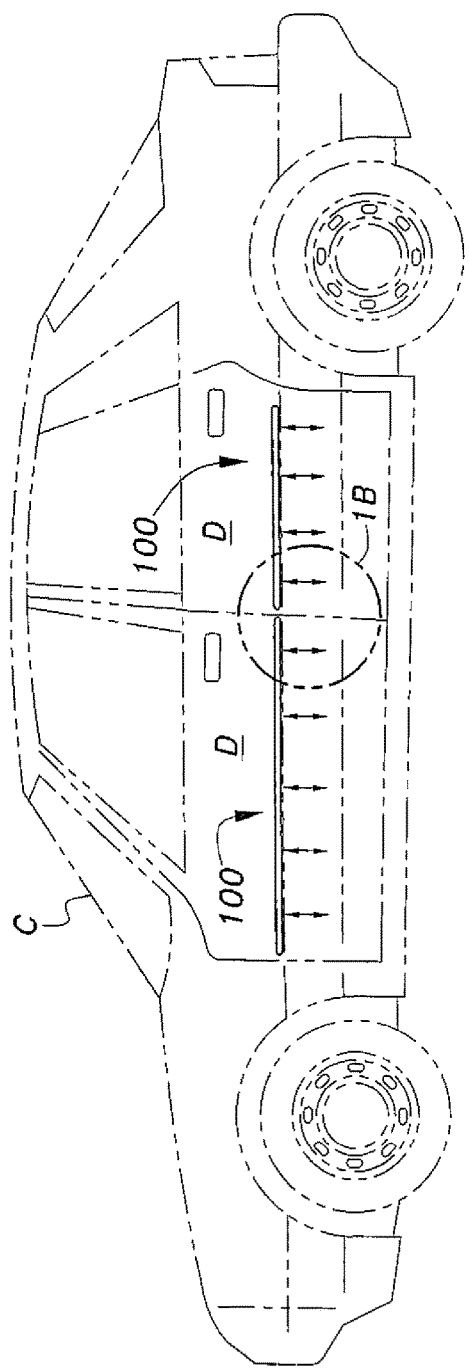
FIG. 1A is an environmental view of a car door protector according to the present invention attached to a car door.

A car door protector 100 is shown in FIGS. 1A through 4B. The car door protector 100 is configured for protecting a door D of a parked car C from dents, scratches, scrapes, and other types of damage that may result from impact by a door D' of another car C' (not shown) parked in an adjacent space. The car door protector 100 includes a base member 120 configured to extend along the width of the door D of the car C, a moveable bumper 110, and a plurality of links 130 connecting the base member 120 to the moveable bumper 110. The moveable bumper can be disposed within a slot 113 of the base member 120 in a first configuration, and moved outside of the slot 113 in a second configuration. The base member 120 can include iron or other ferromagnetic material. The bumper 110 includes a magnet 115, a non-ferromagnetic material 125, and a plurality of holes 135 extending through the bumper 110. The plurality of links 130 can be arc-shaped or C-shaped, with a first end thereof attached to the base member 120 and a second end thereof extending through a respective one of the holes 135 in the bumper 110. Each of the plurality of links 130 facilitates movement of the bumper 110 into and out of the slot 113 in the base member 120. The non-ferromagnetic material 125 is positioned in the bumper 110 between the magnet 115 and the base member 120.

The bumper 110 of the car door protector 100 can be formed from a plastic, foam, rubber, or any other suitable material configured for absorbing an impact, such as an impact from the door D' of an adjacent car (not shown). The magnet 115 can be any suitable type of magnet that can be pulled towards or attracted to the door D' of a car (not shown) that comes within a predetermined distance from the car door protector 100. The predetermined distance can be a distance of about 10 cm or less from the car door protector 10. The magnet 115 and the non-ferromagnetic material 125 can be adjoining, and can together form a generally oval-shaped structure. The bumper 110 can include a slanted surface 140 that is smooth and generally linear. The slanted surface 140 can contact the door D' of the adjacent car. For example, when the magnet 115 positioned within the bumper 110 is pulled towards the door D' of the adjacent car the slanted surface 140 of the bumper 110 can come in contact with the door D' of the adjacent car.

The base member 120 can be generally rectangular and extend along a width of the door D. The slot 113 can extend along the base member 120 for receiving at least a portion of the bumper 110 therein when the bumper is in the stored or first configuration. In the stored configuration, the non-ferromagnetic material can be positioned between the magnet 115 and the inner layer 122 to decrease the magnetic attraction between the magnet 115 and the inner layer 122.

Figure 1B:
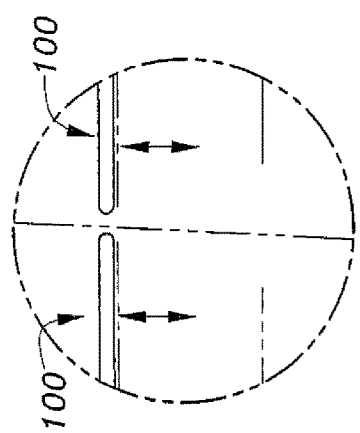
FIG. 1B is an exploded view of the car door protector, according to the present invention.
Figure 2:
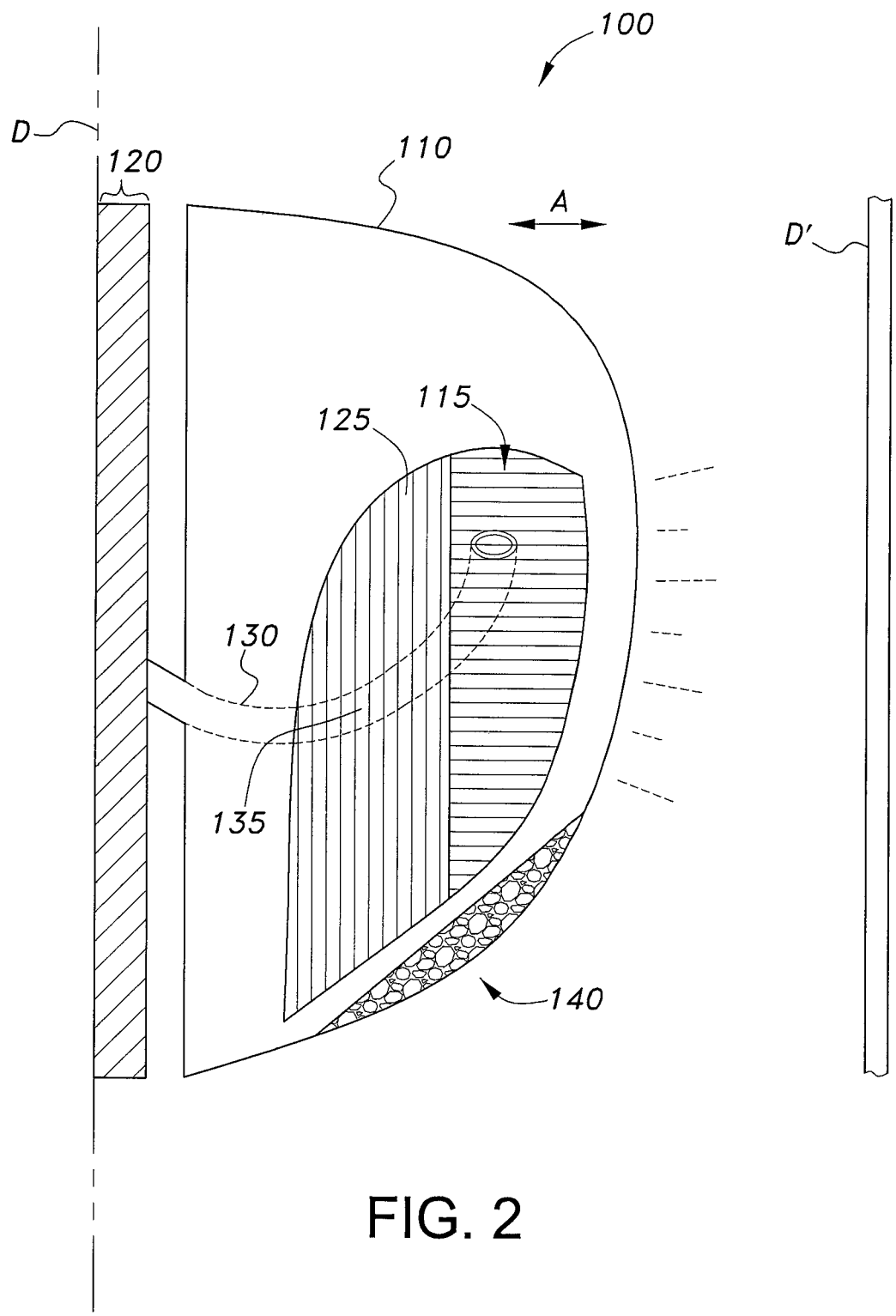
FIG. 2 is a sectional view of the car door protector positioned on a car door, according to the present invention.
Figure 4A:
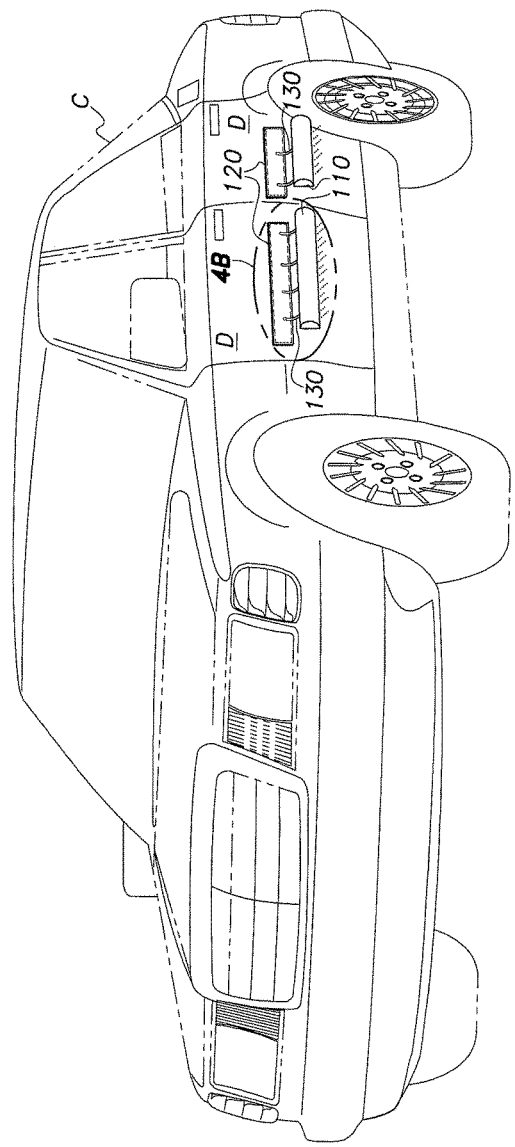
FIG. 4A illustrates the bumper being separated from the base member of the car door protector, according to the present invention.
Figure 4B:
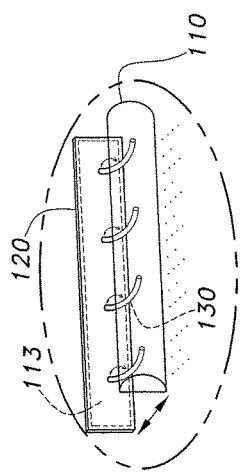
FIG. 4B is an exploded view of the bumper being separated from the base member of the car door protector, according to the present invention.

By way of operation, the base member 120 of the car door protector 100 is first attached onto the car door D of the car C, such as below a center portion of the door D, as illustrated in FIG. 1. When a car door D' of another car is opened and moved towards the door protector 100 on the car door D, the magnet 115 within the bumper 110 is attracted to the door D' of the adjacent car, which causes the bumper 110 to move out of the slot 113, away from the base member 120, and towards the door D' of the other car (not shown), as illustrated by arrow A. As the magnet 115 is being pulled towards the door D', the non-ferromagnetic material is raised toward the base member 120, thereby blocking the magnetic attraction between the magnet 115 and the base member 120 and allowing the bumper 110 to assume the second configuration. The bumper 110 can then absorb the impact from the door D' of the adjacent vehicle and protect the car C from being damaged.

Once the door D' of the adjacent car has been closed, the bumper 110, is pulled back within the longitudinal slot 113 of the base member 120, as illustrated by arrow A, by the links 130 and the force of the magnetic attraction between the magnet 115 and the base member 120 (preferably including iron). As such, the car C with the car door protector 100 can drive away without experiencing any unnecessary drag.

It is to be understood that the present invention is not limited to the embodiments described above, but encompasses any and all embodiments within the scope of the following claims.

I claim:

1. A car door protector, comprising:
   a base member configured to extend along a width of a car door, the base member including a ferromagnetic material;
   a bumper including a magnet, a non-ferromagnetic material, and a plurality of holes; and
   a plurality of links connecting the base member to the bumper, each of the plurality of links having a first end and a second end, the first end of each of the links being affixed to the base member and the second end of each of the links extending through a respective one of the plurality of holes in the bumper.

2. The car door protector according to claim 1, wherein the base member includes a longitudinal slot, at least a portion of the bumper being removably disposed in the slot.

3. The car door protector according to claim 1, wherein the ferromagnetic material includes iron.

4. The car door protector according to claim 1, wherein the non-ferromagnetic material includes copper.

5. The car door protector according to claim 1, wherein the ferromagnetic material includes iron and the non-ferromagnetic material includes copper.

6. The car door protector according to claim 1, wherein the plurality of links are C-shaped.

7. The car door protector according to claim 1, wherein the magnet and the non-ferromagnetic material together form a generally oval shape.

8. The car door protector according to claim 1, wherein the bumper includes a slanted surface.

* * * * *